United States Patent
Laakkonen et al.

(10) Patent No.: US 9,233,305 B2
(45) Date of Patent: Jan. 12, 2016

(54) SYSTEM AND METHOD FOR MANAGING GAME-PLAYING EXPERIENCES

(71) Applicant: Applifier Oy, Helsinki (FI)

(72) Inventors: Jussi Laakkonen, Vantaa (FI); Olli Sinerma, Espoo (FI)

(73) Assignee: Unity Technologies Finland Oy, Helsinki (FI)

( * ) Notice: Subject to any disclaimer, the term of this patent is extended or adjusted under 35 U.S.C. 154(b) by 0 days.

(21) Appl. No.: 13/765,708

(22) Filed: Feb. 13, 2013

(65) Prior Publication Data

US 2014/0228112 A1 Aug. 14, 2014

(51) Int. Cl.
   *A63F 13/10*    (2006.01)
   *A63F 13/30*    (2014.01)
   *A63F 13/40*    (2014.01)

(52) U.S. Cl.
   CPC .............. *A63F 13/12* (2013.01); *A63F 13/10* (2013.01); *A63F 2300/552* (2013.01); *A63F 2300/554* (2013.01); *A63F 2300/634* (2013.01)

(58) Field of Classification Search
   CPC ... A63F 13/12; A63F 13/10; A63F 2300/552; A63F 2300/554; A63F 2300/634
   See application file for complete search history.

(56) References Cited

U.S. PATENT DOCUMENTS

| | | | |
|---|---|---|---|
| 5,259,613 A * | 11/1993 | Marnell, II | 463/42 |
| 5,410,698 A | 4/1995 | Danneels et al. | |
| 5,699,275 A | 12/1997 | Beasley et al. | |
| 6,405,171 B1 | 6/2002 | Kelley | |
| 6,908,391 B2 * | 6/2005 | Gatto et al. | 463/42 |
| 7,171,674 B2 | 1/2007 | Arrouye et al. | |
| 7,632,186 B2 * | 12/2009 | Spanton et al. | 463/40 |
| 7,801,931 B2 | 9/2010 | Tunar et al. | |
| 8,187,104 B2 | 5/2012 | Pearce | |
| 2002/0183105 A1 * | 12/2002 | Cannon et al. | 463/16 |
| 2007/0167210 A1 * | 7/2007 | Kelly et al. | 463/16 |
| 2010/0210351 A1 * | 8/2010 | Berman | 463/25 |
| 2011/0183763 A1 * | 7/2011 | Bytnar et al. | 463/43 |
| 2012/0083330 A1 * | 4/2012 | Ocko et al. | 463/23 |
| 2013/0159412 A1 * | 6/2013 | Robinson et al. | 709/204 |
| 2013/0198321 A1 * | 8/2013 | Martin et al. | 709/217 |

FOREIGN PATENT DOCUMENTS

WO     2013006226 A1     1/2013

OTHER PUBLICATIONS

"Intel IPP—Open Source Computer Vision Library"; Intel Software; Intel IPP—Open Source Computer Vision Library (OpenCV) FAQ | Intel Developer Zone; Mar. 25, 2012.

\* cited by examiner

*Primary Examiner* — Corbett B Coburn
(74) *Attorney, Agent, or Firm* — Ziegler IP Law Group, LLC

(57) ABSTRACT

A system for managing game-playing experiences includes one or more game-playing devices provided with communication interfaces for exchanging game-playing experiences therebetween. Each device includes computing hardware coupled to a graphical interface for presenting an interactive game thereupon. The computing hardware is operable to execute one or more game software products recorded on machine-readable data storage media for generating the interactive game. The one or more game software products include a game experience software module (GESW) for generating metadata concurrently with recording the game-playing experience substantially as presented via the graphical interface which enables the recorded game-playing experience to be subsequently managed prior to communication for distribution for viewing. Optionally, the metadata includes one or more metadata events which are searchable when subsequently viewing the game-playing experience.

25 Claims, 4 Drawing Sheets

SYSTEM AND METHOD FOR MANAGING GAME-PLAYING EXPERIENCES

FIELD

The aspects of the present disclosure relate to systems for managing game-playing experiences. Moreover, the aspects of the present disclosure also relate to methods of operating systems for managing game-playing experiences, for example for sharing game-playing experience within a social media environment. Furthermore, the aspects of the present disclosure relate to software products recorded on machine-readable data storage media, wherein the software products are executable upon or by computing hardware for implementing aforesaid methods.

BACKGROUND

Human beings naturally enjoy interacting in social groups, mutually sharing their knowledge and experience, as well as exhibiting competitive behaviour in order to define a hierarchy of respect within the social groups. Such interaction occurs in many different contexts, amongst which are included competitive sports and competitive games, including electronic games requiring player skill and aptitude. Within a given social group, it is not sufficient for a given individual merely to try to assert their position within a given hierarchy of the given social group, but requires evidence of a given degree of skill in playing games having been achieved. Similar parallels are to be found in physical sports by awarding of medals in recognition of independently-verified performance having been achieved, for example Olympic gold medals.

Electronic games are susceptible to being played within social groups, either with multiple users playing temporally simultaneously or by multiple users playing at mutually different times and then comparing their attained results, for example highest achieved scores, when playing the electronic games. However, merely comparing attained scores is not regarded socially as being most exciting, whereas highlights of game-playing resulting in highest achieved scores being achieved both proves attainment of the highest scores, as well as being inspiration to other players for improving their skills and game playing technique.

In practice, considerable time is potentially expended playing electronic games, such that recording such game-playing experiences results in considerable recorded content, which, for example, needs to be edited to filter out therefrom game playing highlights which might be of interest and inspiration to other players of the game. At present, facilities for providing such identification of highlights are not sufficiently well developed.

In U.S. Pat. No. 8,187,104B, there is described a system and method for creating, editing, and sharing video content pertaining to video game events. The method results in a relatively limited amount of metadata associated with video content pertaining to video game events being generated for enabling the events to be edited and shared with other users. For example, one set of metadata is generated which describes a game-playing encounter, instead of a stream of metadata events; the set of metadata allows mapping of metadata events directly to a timeline through one or more timestamps included in the set of metadata, thereby enabling features beneficial to implementing automated editing of recorded video content to identify interesting moments within the recorded video content based in the set of metadata.

Thus, summarizing above, sharing game-playing experiences of an original player as multiple linked streams of video content, audio content and game data enables other players to replay and thereby appreciate the original player's game-playing experiences. For contemporary electronic games, it takes a long time to replay gaming-experiences for many such games, resulting in recorded game-playing experiences of long viewing duration. Moreover, a problem encountered in practice is that it is difficult and time-consuming for a given player to edit his/her game-playing experience to include only certain types of events, for example based upon their potential interest or appeal to other players to whom the game-playing experience is to be presented. Moreover, it is also difficult for other players replaying game-playing experiences of other players to discover relevant game-playing experiences, or sub-parts thereof, by reviewing algebraic or social recommendations that are imprecise or difficult to interpret. Furthermore, contemporary searching for interesting game-playing experiences is difficult because game-playing experiences can only be searched using text descriptions entered manually by a given player desirable to appreciate other players' experiences. Additionally, even if the aforesaid difficulties are overcome, it is difficult to navigate within a given game-playing experience identified by aforementioned searching, to find interesting parts to watch.

Many game-playing experiences include events that are not immediately obvious to a casual observer, wherein the events may not be properly appreciated without graphical- or textural-highlights to draw the casual observer's attention to event detail; such graphical- or textural-highlights are beneficially implemented by way of momentary annotations and similar. Moreover, a given game-playing experience can be improved by the game-playing replaying includes visualizations of other sensor data, for example touch, microphone-captured sounds, movement sensors and similar.

A further problem encountered with contemporary game-playing systems is that video game players desire to define themselves in a content of a given type of video game and compare themselves with other players of the same game. Comparing high-level information, for example a given player's high scores and achievements when playing the given game, provides a way of comparing the given player's performance with that of other players, but provides relatively little comparative information, for example gaming prowess, style of game-playing, and preferences when playing the given game. Such limitations when contemporarily making comparisons between players hinders the given player trying to connect with other players within or among a social network, for example other players who are interesting to competing again in a given social network or whose game-playing experiences are interesting to watch and appreciate.

SUMMARY

The aspects of the present disclosure seek to provide a system for managing game-playing experiences, for example for enabling improved highlighting, searching of interesting game-playing events, and improved comparison between game-playing experiences of a plurality of game-playing participants within a social network, and programmatically editing game-play experience replays. Additionally the aspects of the present disclosure seek to provide a system for identifying from the game-playing experience interesting events. Additionally the aspects of the present disclosure seek to provide a system for recording game-events and related metadata for the game.

Moreover, the aspects of the present disclosure seek to provide an improved method of managing playing experiences, for example for enabling improved searching of interesting game-playing events, and improved comparison between game-playing experiences of a plurality of game-playing participants within a social network.

According to a first aspect of the of the present disclosure, there is provided a system for managing game-playing experiences, wherein the system includes one or more game-playing devices provided with communication interfaces for exchanging game-playing experiences therebetween, wherein each device includes computing hardware coupled to a graphical interface for presenting an interactive game thereupon, and wherein the computing hardware is operable to execute one or more game software products recorded on machine-readable data storage media for generating the interactive game, the one or more game software products include a game experience software module (GESW) for generating a stream of metadata concurrently with recording the game-playing experience substantially as presented via the graphical interface which enables the recorded game-playing experience to be subsequently managed prior to and after communication for distribution for viewing.

The aspects of the present disclosure provide the advantage in that the concurrently-recorded metadata enables the recorded game-playing experience to be more effectively and accurately managed.

Optionally, in one embodiment of the system, the metadata includes timestamps for synchronizing with timestamps included in the recorded game-playing experience.

Optionally, in one embodiment of the system, the metadata includes one or more metadata events which are searchable when another user is searching for relevant game-play experience to watch and subsequently when viewing the game-playing experience.

Optionally, in one embodiment of the system, the one or more metadata events are automatically generated by the host game through a game experience software module (GESW). Optionally, in one embodiment, the GESW can generate its own metadata without needing input from the host game. Additionally, in one embodiment, the user can enter the metadata.

Optionally, in one embodiment of the system, the communication interfaces are operable to communicate the recorded game-playing experience via a database arrangement (GESS) for selective distribution therefrom to viewers. More optionally, in one embodiment of the system, the database arrangement (GESS) is operable to generate one or more social groups of users and related properties for selective distribution of game-playing experiences therebetween.

Optionally, in one embodiment of the system, the one or more devices comprise or are implemented using at least one of: smart telephones, pad computers, tablet computers, lap-top computers, personal computers, game-playing consoles.

According to a second aspect of the present disclosure, there is provided a method of managing game-playing experiences in a system, wherein the system includes one or more game-playing devices provided with communication interfaces for exchanging game-playing experiences therebetween, wherein each device includes computing hardware coupled to a graphical interface for presenting an interactive game thereupon, and wherein the computing hardware is operable to execute one or more game software products recorded on machine-readable data storage media for generating the interactive game, characterized in that the method includes:

(a) arranging for the one or more game software products to include a game experience software module (GESW); and (b) using the game experience software module (GESW) to generate metadata concurrently with recording the game-playing experience substantially as presented via the graphical interface for enabling the recorded game-playing experience to be subsequently managed prior to and after communication for distribution for viewing.

Optionally, in one embodiment, the method includes arranging for the metadata to include timestamps for synchronizing with timestamps included in the recorded game-playing experience.

Optionally, in one embodiment, the method includes arranging for the metadata to include one or more metadata events which are searchable when a user is searching for a game-play experience to watch and subsequently when the user is viewing the game-playing experience. Optionally, in one embodiment, new metadata might be created and added when the user interacts with the gameplay experience while watching it (or interacting with it). Optionally, in one embodiment, users can edit metadata related to their gameplay before sharing it and also after sharing it.

Optionally, in one embodiment, the method includes generating one or more metadata events automatically by the game experience software module (GESW).

Optionally, in one embodiment, the method includes operating the communication interfaces to communicate recorded game-playing experiences via a database arrangement (GESS) for selective distribution therefrom to viewers. More optionally, in one embodiment, the method includes operating the database arrangement (GESS) to generate one or more social groups of users and related properties for selective distribution of game-playing experiences therebetween.

Optionally, in one embodiment, the method includes implementing the one or more devices using at least one of: smart telephones, pad computers, tablet computers, lap-top computers, personal computers, game-playing consoles.

According to a third aspect of the present disclosure, there is provided a software product (GESW) recorded on machine-readable data storage media, characterized in that the software product (GESW) is executable upon computing hardware for implementing a method pursuant to the aspects of the present disclosure.

It will be appreciated that features of the present disclosure are susceptible to being combined in various combinations without departing from the scope of the present disclosure as defined by the appended claims.

DESCRIPTION OF THE DIAGRAMS

Embodiments of the aspects of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE PRESENT DISCLOSURE

In overview, the aspects of the present disclosure are concerned with a system which is operable to record game-playing experiences, together with concurrently defining and recording metadata, for example a stream of metadata, pertaining to game experience actions performed by a given player when playing a game; the given player is conveniently referred to herein as being a "user" of the system. The metadata can be created by at least one of:

(i) generated by the user; and
(ii) generated automatically by software included in a game-playing terminal, wherein the software is referred to a Game Experience Recording Software (GESW) component.

The metadata, which is recorded during playing of a game and/or entered by the user, can be employed to perform at least one of:

(a) to describe a corresponding game-playing experience;
(b) to edit the game-playing experience;
(c) to annotate the game-playing experience;
(d) to highlight the game-playing experience;
(e) to execute searches;
(f) to navigate contents of the game-playing experience;
(g) to share the game-playing experience;
(h) to describe the user through his gameplay in one or multiple games; and
(i) to recommend to a user interesting other users or game-play experiences that are relevant based on the metadata collected about users and game-play experiences and correlations between those.

Moreover, on account of the metadata being linked to the user that generated the game-playing experience, as well as a given type of game from which the metadata was recorded, the metadata can be used to search for other players that are interested in the given type of game, for example in diverse social networks. Furthermore, the metadata enables various types of analyses to be performed regarding behaviour of players during game-playing experiences, for example for analysing behaviour of players under stress when playing the given type of game, for example for automated coaching services to improve playing performance of players of the given type of game.

Figure 1:
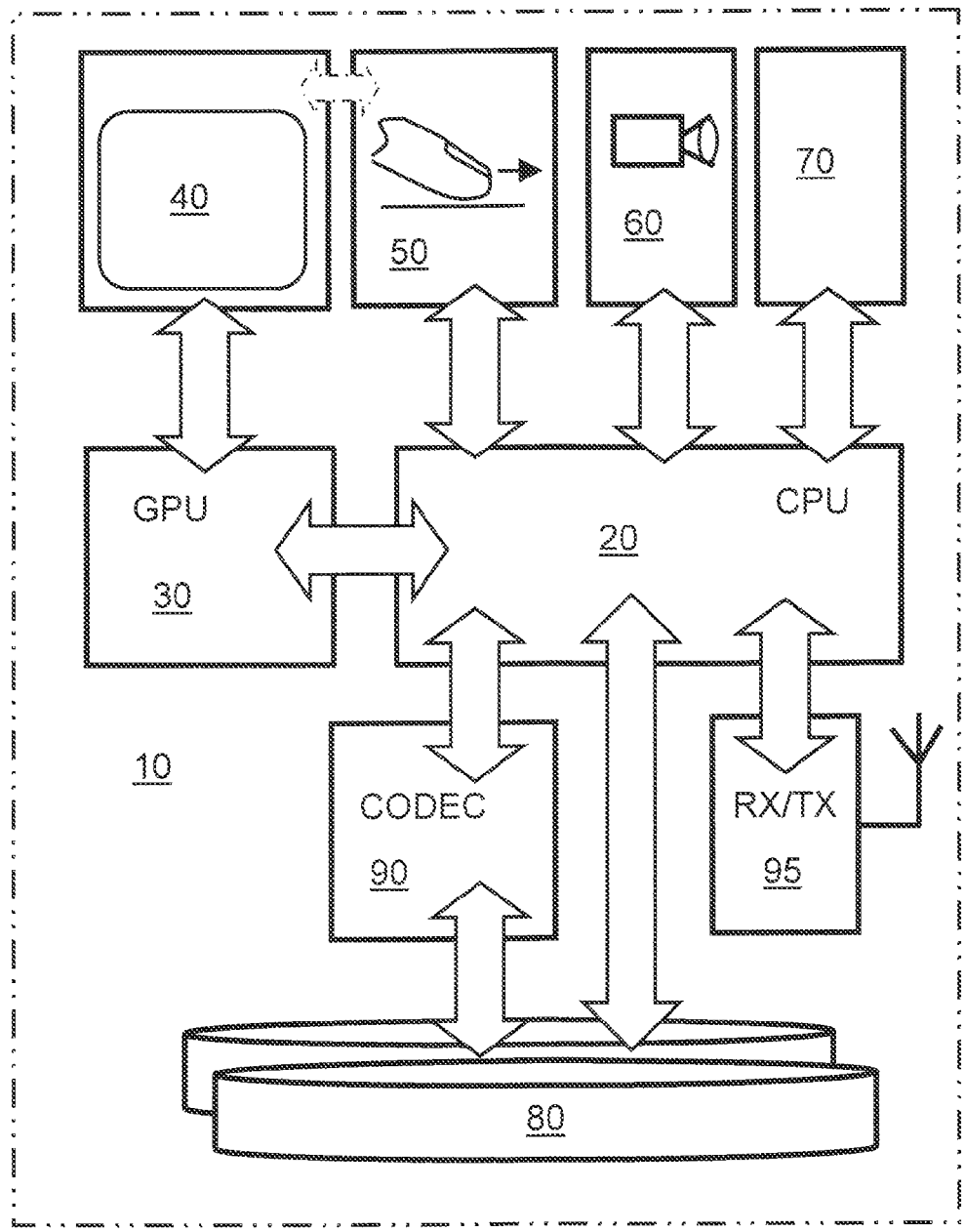
FIG. 1 is an illustration of an embodiment of a system for managing game-playing experiences pursuant to the aspects of the present disclosure.

The various embodiments of the system, and associated methods, are capable of being implemented, wherein game-playing devices are, for example, implemented as portable devices, for example wireless-enabled mobile terminals, smart phones, mobile telephones, cell phones, tablet computers, pad-computers and similar; beneficially, such game-playing devices include computing hardware with sufficient data memory capacity to accommodate the aforementioned GESW software. In FIG. 1, there are shown component parts of a game-playing device indicated generally by 10. The game-playing device 10 includes computing hardware (CPU) 20 coupled via a Graphical Processor Unit (GPU) 30 to a graphical display 40. Optionally, the graphical display 40 is implemented as a touch-sensitive display which is operable to provide spatial screen-touch tactile information back to the computing hardware (CPU) 20, via use of a touch sensor 50 associated with the graphical display 40. The game-playing device 10 beneficially also includes a camera 60 facing towards the user when playing a game on the game-playing device 10, wherein the camera 60 is operable to generate a camera output signal which is coupled to the computing hardware (CPU) 20. Moreover, the game-playing device 10 beneficially includes other sensors 70, for example one or more of: an accelerometer, an inclination sensor, a microphone, touch controls and similar. The computing hardware (CPU) 20 is coupled to data memory 80, either directly or via a hardware encoder/decoder 90, for example for performing data compression. Moreover, the game-playing device 10 includes a wireless interface 95 for enabling the computing hardware 20 to communicate via a wireless communication network to databases and/or to game-playing devices of other users.

In operation, game-playing software is executed upon the computing hardware (CPU) 20, and graphical presentations to the user are generated by the Graphics Processor Unit (GPU) 30 in response in instructions received from the computing hardware (CPU) 20. The game is presented to the user via the graphical display 40. In addition to the aforesaid game-playing software, for example proprietary third-party software provided by well-known games-software companies, the computing hardware (CPU) 20 is operable to execute Game Experience Recording Software (GESW), wherein GESW includes a set of software library components. During development of software for the game-playing device 10, a software developer uses GESW components as an integral part of the game, namely by way of a single monolithic software application, namely for providing a host software application which includes features for integrated recording, sharing and playback of a game-playing experience together with concurrently-recorded metadata.

Beneficially, the GESW includes an Application Program Interface (API) which is operable, when executed upon the computing hardware (CPU) 20, to capture, namely to take a "snap-shot", of information contents of the Graphics Processor Unit (GPU) at any given time when playing a game on the game-playing device 10; in other words, the API is operable capture rendered presentation images provided on the graphical display 40 to the user. Optionally, the captured images are directed through the hardware encoder/decoder 90 to the data memory 80 for storage therein. Beneficially, the game software can be used to control the API to capture images which are different to the rendered image presented to the user via the graphical display 40; for example, the game software is operable to exclude certain user-interface graphical elements which are irrelevant or distracting to other users when watching capture game-playing experience generate by the given user of the game-playing device 10.

As aforementioned, the game-playing device 10 optionally includes the camera 60 which is disposed upon a front face of the device 10, namely on a similar face of the device 10 as the graphical display 40; the GESW is beneficially operable when executed upon the computing hardware (CPU) 20 to record video images of the user when he/she is playing a game for which metadata is concurrently being generated. Optionally, the video images are presented in a sub-field, for example a window, in the graphical display 40 whilst the user is engaged in game-playing activities. Such captured video of the user is beneficially directed though the encoder/decoder so that data storage capacity of the data memory 80 is used in a sparing manner, by way of compressing the video images.

Optionally, the GESW is configurable to record user gestures, namely User Interface data (UI data), entered by the user via the graphical display 40 implemented as a touch-screen, and also as sensed (Sensor Data) by one or more of the sensors 70, for example acceleration, orientation of the device 10 as measured using a magnetometer, location of the device as measured using satellite GPS or cellular-network GPRS, temperature of the game-playing device 10 and so forth; there is thereby recorded game-control gestures (Game Control). The GESW is also optionally configurable to capture via microphone sounds (Mic Sound) generated by the user that accompany playing of a game. Moreover, the GESW is optionally also configurable to record game sounds (Game Sound), for example explosion sounds, gun-fire sounds, beeps and such like, in a separate audio content stream stored in the data memory 80, for example in data-compressed form.

The GESW is also configurable to replay, for example to the user of the game-playing device 10, recorded game-playing events, for example events resulting in achievement of a high score, successful completion of a task in a given game, user's "death" in a given game, or other types of events arising from the user's interaction with the game hosted by, or via, the game-playing device 10 (Game Events) or statistical information (Game Stat) pertaining to the user's playing of games on, or via, the device 10. The game software executed on the device 10 can, via the aforesaid API, be configured to add, remove and annotate game events (i.e. annotate Game Events), for example in real time during playing of games, in response to the user's control of the game, for example provide personalized congratulatory messages in the recording of the game-playing experience. There is thereby provided a user-friendly manner of editing and/or selecting which parts of a recorded game-playing experience are to be shared with other users, for example within a given social environment; for example, the user, after playing a given game, can select which parts of the highlights of the game-playing experience are to shared with other users.

Information recorded whilst the user plays the given game (namely one or more of: UserFace Video, Game Video, Mic Sound, Game Sound, Game Control, Game Stat, UI Data, Game Events, and similar) are recorded in the data memory 80, although later downloading of the recorded data via the wireless interface 95 to a remote server (Experience Server) for further distribution therefrom to other users is optionally accommodated; such communication is beneficially implemented via Wi-Fi or cellular wireless communication networks, for example via contemporary 3G or 4G wireless communication networks. All data recorded in the data memory 80 pertaining to a given game-playing experience are mutually linked by way of time stamping of the recorded data. As aforementioned, selection and management of recorded data generated by the game-playing experience is handled by the GESW, namely by one or more of its library of software components; for example, the GESW includes the API which can be employed by a games developer to set rules for recording and sharing of recorded game-playing experiences stored in the data memory 80.

Figure 2:
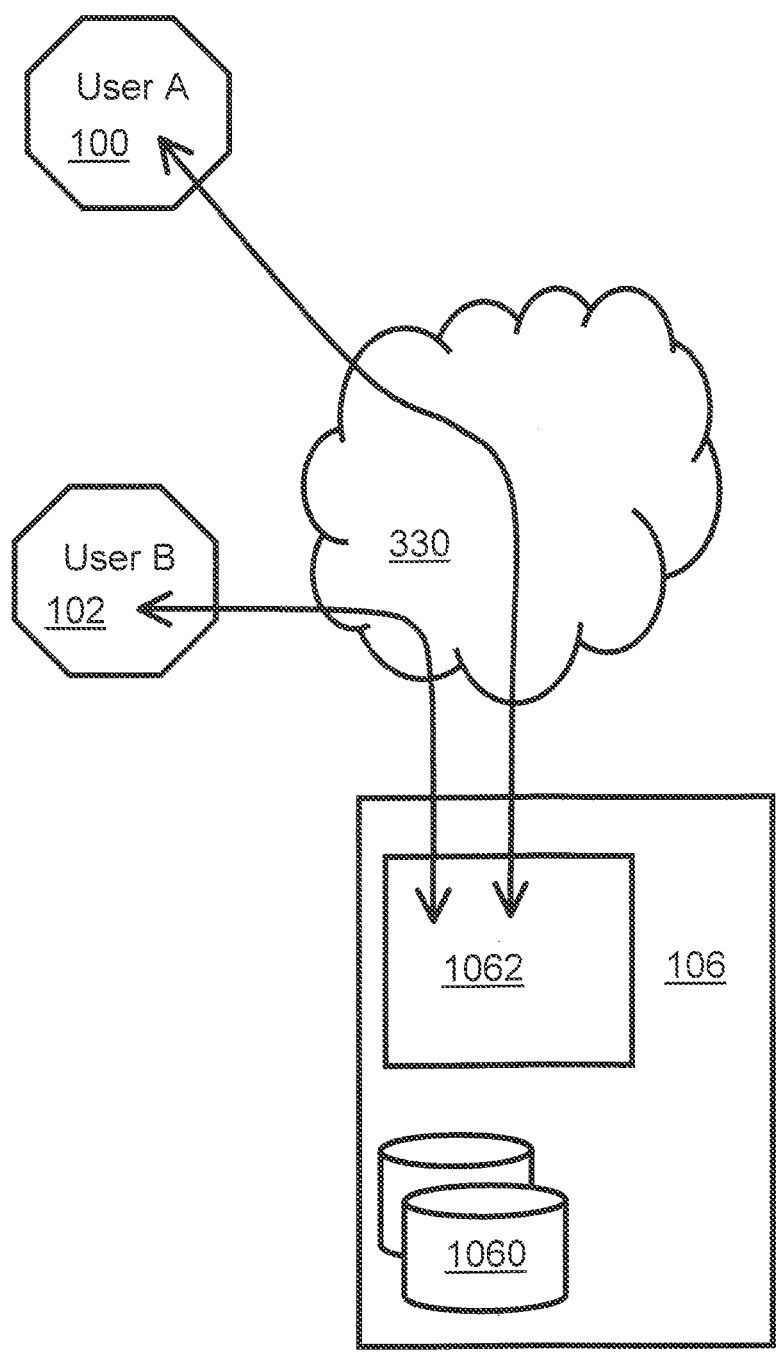
FIG. 2 is an illustration of data communication occurring in operation within the system of FIG. 1.

Thus, referring to FIG. 2, the device 10 is represented by a gaming terminal A 100 which can be configured to send all, or a sub-set thereof, of the recorded content stored in the data memory 80 to a Game Experience Sharing Service (GESS) 106. The GESS 106 includes one or more data servers 1062 and a database 1060. Moreover, the one or more servers 1062 are optionally spatially co-located or, alternatively, spatial distributed between a plurality of mutually remote sites. Uploaded recorded data from the gaming terminal A 100 is stored in the database 1060 of the GESS 106.

Sharing of recorded data corresponding to game-playing experiences beneficially occurs via the one or more servers 1062, whereat the recorded data is optionally transcoded to various bitrates appropriate for recipient devices whereat the game-playing experience is to be presented to other users. Optionally, sharing of the recorded data, for example from the device A 100 to a recipient device B 102, occurs via one or more point-to-point data connections established within a communication network, alternatively via one or more peer-to-peer communication links, or any combination thereof.

A user of the device B 102 is able, subject to credentials and settings which control sharing rights, to access the GESS 106; the settings which control sharing rights optionally include settings such as "share to all", "share to friends", "private" and so forth. Optionally, the user B 102 has at least one game installed in his/her game-playing device B 102 which has a GESW which is compatible with the GESW of the device A 100; the game of the device B 102 is optionally the same as the game of the device A 100, alternatively optionally mutually different. A user of the device B 102 is thereby able to record game-playing experiences in a substantially similar manner to the user of the device A 100. Optionally, the GESS provides an interface which is accessible via standard contemporary browser software, for example contemporary FIREFOX™, SAFARI™, INTERNET EXPLORER™, CHROME™ and similar.

As aforementioned, the GESW includes a library of software components and is beneficially implemented as a software module, wherein the GESW module, when executed upon computing hardware, enables game-playing experiences to be recorded automatically whilst the given user plays a game, and wherein such automatic recording includes generation of corresponding metadata. Moreover, the GESW module is operable when executed to record multiple streams of data corresponding to the game-playing experience, namely one or more of:

(a) GameVideo: video content corresponding to the game;
(b) GameAudio: audio content corresponding to the game;
(c) FaceCamera: video content of the user's face captured using the camera 60 during game-playing activities;
(d) Microphone: audio content generated by the user captured during game-playing activities;
(e) Touch screen sensors: content corresponding to the user touching the graphical display 40 during game-playing activities; and
(f) Movement sensors: content corresponding to sensing executed by the one or more sensors 70.

Each of the multiple streams of data has sets of metadata associated therewith, for example for enabling highly precise analysis, editing and searching of the streams of data to be performed, namely advanced management thereof. As aforementioned, the GESW module records the stream of metadata arising from the recorded game-playing experience, wherein the metadata is time-stamped to enable it to be synchronized to other recorded streams of data in (a) to (f) above.

The aforesaid metadata stream includes one or more metadata events (Metadata Events); each metadata event is a data structure which describes something that has happened during the game-playing experience or in a user-environment hosted by the device 10, *mutatis mutandis* by the terminals A 100, B 102. Such metadata events beneficially describe one or more of:

(i) events that are invisible to the user of the device 10 when playing a game thereupon, for example a metadata event describing an internal state of the game, for example an increase in difficulty level based upon adaptation to a skill of the user;

(ii) events that are visible to the user of the device 10 when playing a game thereupon, for example a metadata event describing the user passing a checkpoint or killing a monster in the game hosted by the device 10;

(iii) events that describe a state of the game being played by the user on the device 10, events that describe the user, and events which describe the device's computing environment, for example increased volume of a microphone signal generated by a microphone included amongst the one or more sensors 70 which is indicative of the user shouting excitedly and/or rapid frequency of tapping by the user on the graphical display 40 when implemented as a touch-sensitive display; and (iv) events that are recorded in response to explicit instructions from the user to create one or more events, for example a user taps a button on the graphical display 40 to indicate that a meaningful moment or event has occurring during playing of the game.

However, it will be appreciated that the user is able to add additional metadata to the recorded game-playing experience, after completion of initially generating the game-playing experience using the device 10. The additional metadata can be recorded by explicit instruction from the user of the device 10, and include specific data entered by the user, for example metadata indicative of a number of times the user has played the given game (i.e. experienced or novice player). Beneficially, such metadata is can be automatically stored on the GESS and later associated with the user's profile, for example to support searching and analysis of algorithmic discovery of relevant game-playing experiences, as well as to provide personalized features for the user, for example medals, awards and achievement recognition for the given user.

In structure, the metadata events each include multiple data items or elements, for example spatial data points, that describe their associated game events. Certain of the data items or elements are beneficially in a standardized format which enables them to be compared with other data from other types of games, whereas other data items or elements can be specifically defined by a game developer who developed the game for examples of the device 10, for example for a specific type of smart phone model. The data items beneficially include one or more of: player coordinates in a coordinate system defined by the game, coordinates of an image of a monster presented on the graphical display 40, text annotations, importance level of the event, and so forth.

Metadata events, and each data item or element associated therewith, can be defined to be "visible" or, alternatively, "invisible", such that certain metadata events are only used by a developer during development and debugging of the game or the GESW or GESS systems to operate the system and to e.g. optimize distribution of game-play experiences to relevant users or identify errors or low performance within the system itself, whereas visible data items or elements can be employed for searching purposes, discovery purposes, content sharing purposes, and user-editing purposes. Optionally, metadata data items or elements are defined to be user-editable, thereby enabling the user to create, edit and modify associated metadata events. Alternatively, a given metadata event is non-editable by the user, for example a high score, where authenticity of the data item or element must be ensured. Optionally, the user is able to set any metadata tag to any place on the game-playing experience; more optionally, the one or more metadata tags are selected by the user from a set of pre-defined metadata tags, such as shown in the non-limiting example of Tables 1 and 2:

TABLE 1

Examples of game-event tags

| Metadata tag | Description | Notes |
|---|---|---|
| "GameOver" | End-of-game related tag | This tag can be associated in the game software to certain limited resources, for example a number of "lives" that the user is able to consume when playing the game. |

TABLE 1-continued

Examples of game-event tags

| Metadata tag | Description | Notes |
|---|---|---|
| "HighScore" | Defines a moment in time when the user attained a high score when playing the game | This tag can be associated in the software to a moment in time when a given score A is greater than another given score B. Optionally, the scores A and B can pertain to a number of game points or a number of collected credits. |
| "Fight" | Defines a moment in time when game objects are mutually interacting for mutually defeating one another | This tag is associated in the software to be triggered when a given object A of the game is within a certain spatial distance, in equivalent spatial units of the given, from a given object B of the game, or in an event that the objects A, B are exchanging information. |
| "Start" | Defines a moment in time when playing of the game is commenced. | This tag is beneficially associated with starting of the game, or a moment in time when the user first executes any actions in respect of the game. |
| Etc. | Etc. | Etc. |

TABLE 2

Examples of sensor-based tags

| Metadata | Description | Notes |
|---|---|---|
| "HighG" | Defines a moment when sensors 50, 60, 70 of the game-playing device 10 sense considerable movement of the device 10, for example in an event that the user casts the device 10 in a moment of frustration or winning ecstasy | This tag is beneficially associated with any actions, for example when measured acceleration exceeds a pre-defined acceleration threshold. |
| "HotGaming" | Defines a moment in time when it is likely that the user is playing a game on the game-playing device 10 in a manner which is too intensive | This tag is beneficially associated with a temperature sensor and/or humidity sensor of the game-playing device 10, and is automatically set when a temperature and/or a humidity sensed exceeds one or more pre-defined threshold values, or a temporal rate of change in the temperature and/or the humidity exceeds one or more pre-defined threshold values. |
| "Dark" | Defines an ambient illumination level in a physical environment in which the game-playing device is employed when in operation | The tag is beneficially associated with a illumination intensity sensor, for example implemented by way of the camera 60, for monitoring the illumination level surrounding the game-playing device 10 when in use. |
| Etc. | Etc. | Etc. |

Filtering and editing of recorded game-playing experiences will now be described, for example executed by the given user before his/her game-playing experience is broadcast to other users via the aforesaid GESS. Once recording of the game-playing experience has been completed on the device 10 by the GESW, it is then available to be replayed by the user of the device 10; the metadata stream enables the user to navigate the game-playing experience for editing one or more sections of the game-playing experience, as appropriate. Such editing can be additive, namely the user adds additional information, for example additional metadata, or can be subtractive, namely the user deletes potentially uninteresting portions of the game-playing experience, for example by inserting user-programmable hops, namely fast forward or faster reverse, over uninteresting portions of the game-playing experience, for example merely to concentrate on highlights of the game-playing experience, or by removing portions of the content from the game-play experience. Moreover, the metadata can be configured by the GESW to control a manner in which the user, or other users can access the game-playing experience; for example, the metadata can be used by the GESW to customize how the user, or other users, are prompted to watch the recording of the game-playing experience by selecting which recorded game-playing events are highlighted to the user or other users, for example a thumbnail image is selected to be shown from a point in the recording whereat the user demonstrates a high degree of skill, and to customize the text prompting the user to access the recording, for example:

"You have reached level 5—show your friends how you killed the Moosepoodle monster!"

wherein the prompt is generated by analysing the Metadata Events to highlight the most meaningful moments that the user experience during playing of the game.

Thus, the metadata is employed, when the user accesses the recording of the game-playing experience, to provide a better quality of viewing experience, as well as a better editing experience. Moreover, as aforementioned, the metadata provides for better navigation within the game-playing experience, for example to navigate between interesting moments in the game-playing experience by tapping "back" and "forward" buttons that allow fast-forward and fast-reverse through the game-playing experience and resumption of playing when a highlight is reached, as defined by the metadata. Optionally, the user can be presented by the GESW with a graphical timeline of the game-playing experience, wherein the timeline includes one of more symbols therealong corresponding to one or more highlights defined in the metadata. Moreover, the metadata is susceptible to being edited to add special features, for example "liking" or "voting" or "commenting" features, for other users to provide feedback, for example via the GESS, regarding whether or not they like the game-playing experience or parts thereof; optionally, the GESS collates statistical data pertaining to such feedback.

Beneficially, when the user is editing the recorded game-playing experience, in one embodiment, the corresponding recorded metadata stream is employed to split the recorded game-playing experience into segments, wherein each segment is created to correspond to an associated Metadata Event, and wherein the Metadata Event defines a starting point and an ending point of the segment. Optionally, data points stored in the Metadata Event are used to describe each segment, for example annotating the segment, for example "Last Battle of the Moosepoodle Monster against the Basque Trolls". Dividing the game-playing experience into segments assist the user to navigate the game-playing experience, for example to identify which segments are to be edited, for example deleted, annotated and so forth as described in the foregoing examples.

The device 10 and its GESW, for example in combination with the GESS, provide a game-playing system which provides an automatic editing function that employs editing rules defined at system-level, wherein the editing rules are extended and customized depending upon type of game and user-preferences, for automatically editing the recorded game-playing experience. Non-limiting examples of editing rules are provided in Table 3 as follows:

TABLE 3

Examples of editing rules

| Rule | Notes |
|---|---|
| "If the user reaches a high score, then a segment associated with attaining the high score should be preserved (namely not deleted) and a highlight annotation should be added to the metadata of the preserved segment" | |
| "Define that all segments where the Metadata Event's importance data is less than a pre-defined minimum are to be automatically removed from the recording of the recorded game-playing experience" | For reducing a size of the recording in the data memory 80, for example for freeing data storage capacity for other purposes. |
| "Segment should be fast-forwarded at x4 speed if the Metadata Event's importance data is set to a medium value" | |

Optionally, in one embodiment, after an automatic edit has been executed by the GESW, the user is able to employ the GESW to edit and fine-adjust the initially automatic edit performed by the GESW.

When the user is desirous to share his/her recording of a game-playing experience, the Metadata Stream is shared via the GESS, together with a remainder of data pertaining to the game-playing experience. The recording of the game-playing experience is uploaded to the GESS and, there, the Metadata Stream is analyzed by the GESS and used to describe automatically the uploaded recording of the game-playing experience.

When another user, for example a spectator user, is accessing the GESS, he/she can find a selection of game-playing experiences to watch in a plurality of different ways, including shares from pertinent social group connections, as well as being able to perform algorithmic searches of the game-playing experiences and receive various recommendations. The Metadata collected by the GESS is optionally combined with data collected from the user's behaviour within the GESS for further personalizing game-playing experiences provided via the GESS. Moreover, the user can be provided with a social feed regarding game-playing experiences which have been shared by other users with a given user, wherein the social feed is susceptible to being adapted to characteristics of the given user, for example his/her game-playing competences and scoring abilities as recorded by the GESS.

When a given user finds, via the GESS, an interesting game-playing experience to watch, the Metadata Stream associated with the game-playing experience is used to provide navigation within the game-playing experience when presented to the given user, for example for navigating back and forth between interesting, highlighted events, for example by employing a visual timeline where key events are highlighted.

Figure 3:
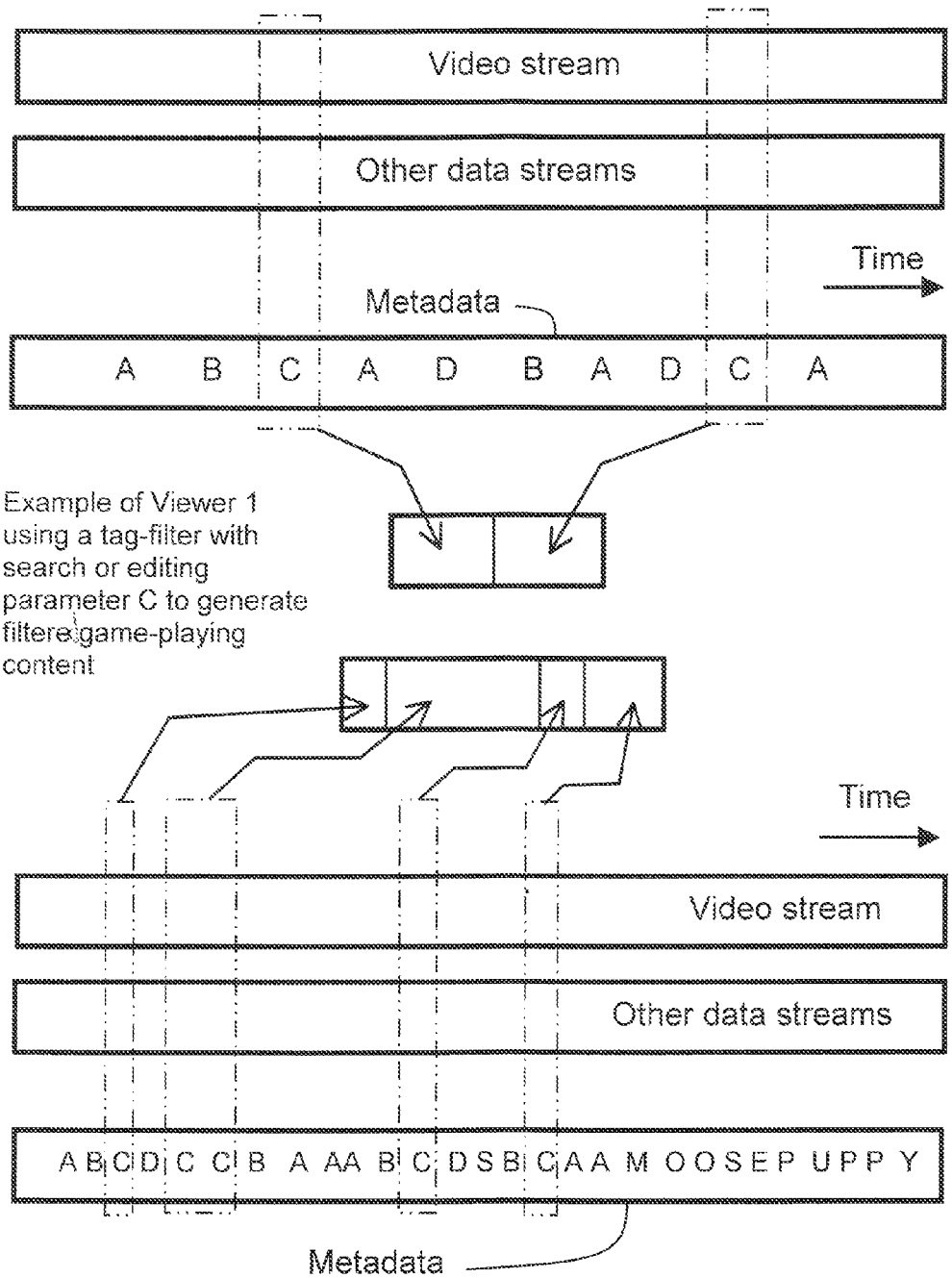
FIG. 3 is an illustration of a method of filtering game-playing experiences using associated metadata tags.

Referring to FIG. 3, there is shown an example of a viewer 1 wanting to see game-playing experiences with a given metadata tag "C". The viewer 1 access the GESS 106 and is desirous to watch a game-playing experience of a given player A and a player B. Both players A, B have shared the entire game-playing experience, including associated metadata.

Figure 4:
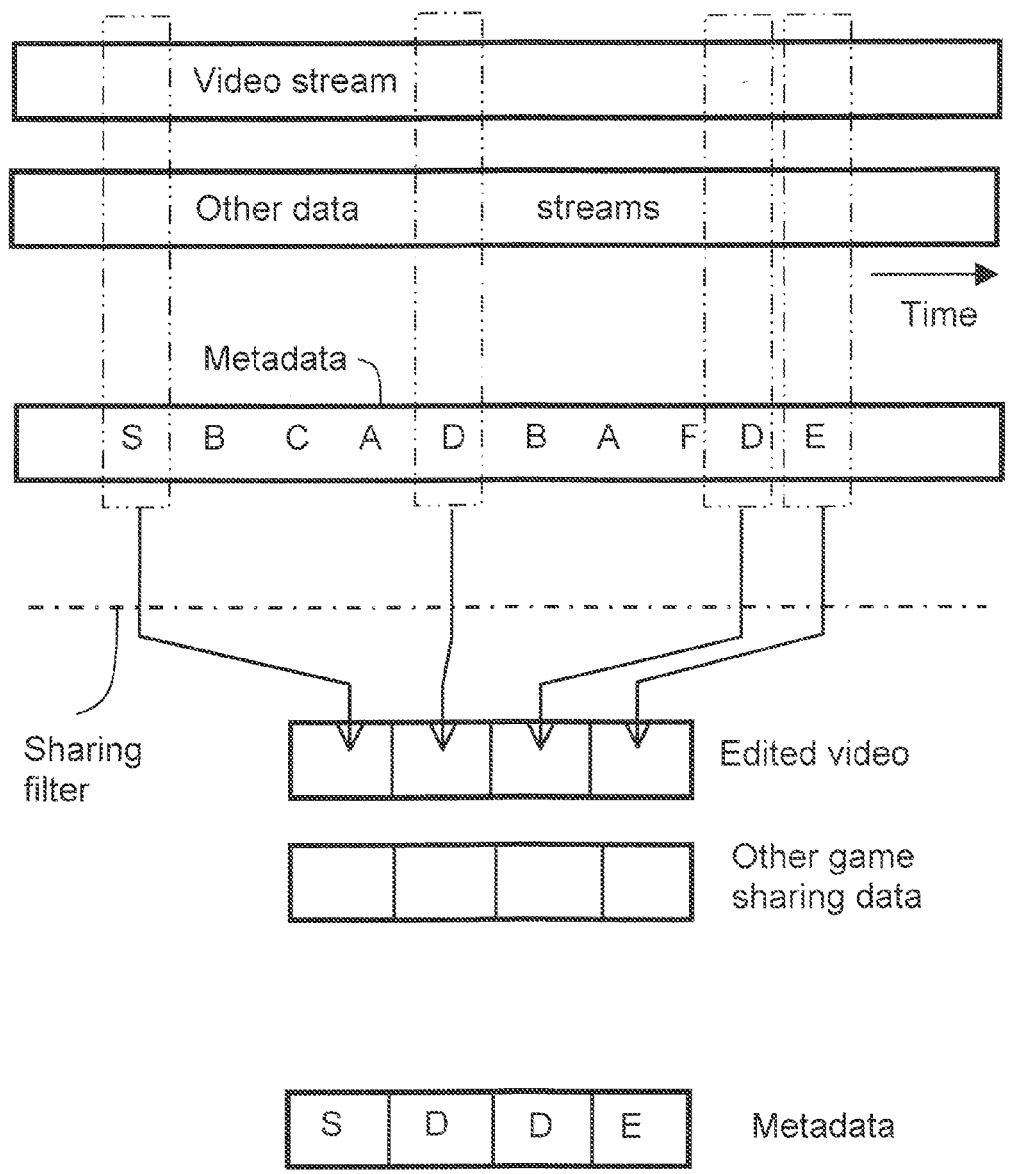
FIG. 4 is an illustration of a method of sharing filters for filtering game-playing experiences using associated metadata tags.

Referring to FIG. 4, there is shown an example of employing filters for enabling creation of an edited version of game-playing experiences in an automated manner. A sharing filter, for example, is optionally able to select a defined set of tags, for example tags "S", "D", "E" pertaining to the game-playing experience. There is thereby provided functionality for generating exciting annotated game-play experiences for viewing.

Modifications to aspects and embodiments of the present disclosure described in the foregoing are possible without departing from the scope of the invention as defined by the accompanying claims. Expressions such as "including", "comprising", "incorporating", "consisting of", "have", "is" used to describe and claim the aspects of the present disclosure are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A system for managing game-playing experiences, comprising:
   a game playing device configured to execute an interactive computer game, record an execution of the computer game, the recorded execution of the computer game comprising a gameplay experience;
   at least one other game playing device configured to execute the interactive computer game and one or more of record or replay a different gameplay experience;
   a communication interface for exchanging different recorded gameplay experiences between different game playing devices, the communication interface configured to convert a gameplay experience on one game playing device to a format compatible for another game playing device;
   the different game playing devices comprising computing hardware coupled to a graphical interface for presenting the interactive computer game thereupon, and wherein the computing hardware is configured to execute a game software product recorded on machine-readable data storage;
   the game software product including a game experience software module (GESW) for generating during the execution of the interactive computer game a stream of metadata concurrently with recording a corresponding gameplay experience substantially as presented via the graphical interface, the stream of metadata enabling the recorded gameplay experience or an arbitrary number of points or segments of time in the recorded gameplay experience to be subsequently described, identified, analysed, managed, searched or edited;
   the game experience software module, when executed by the computing hardware, being configured to detect and identify certain events that occur during the recorded gameplay experience; identify segments of the recorded game play experience that include the detected event, add a highlight annotation to the stream of metadata to identify the segment as a highlight event, create an edited version of the recorded gameplay experience that includes only the highlight events, and distribute the edited version for replay by the at least one other game playing device;
   wherein the stream of metadata includes timestamps and is configured to one or more of:
   identify or describe a corresponding gameplay experience or arbitrary number of points in time or segments thereof;
   edit the recorded gameplay experience;
   annotate the recorded gameplay experience;
   highlight the recorded gameplay experience;
   execute searches for other gameplay experiences or points of interest or segments within different gameplay experiences;
   navigate contents of the recorded gameplay experience;
   share the recorded gameplay experience;
   describe the user through his gameplay in one or multiple games;
   describe the user through observing what types of gameplay experiences and points of interest within different gameplay experiences are viewed;
   search for other players interested in a given type of game associated with the recorded gameplay experience; and
   recommend to a user interesting other users or gameplay experiences that are relevant based on the metadata collected about users and game-play experiences and correlations between them.

2. The system as claimed in claim 1, wherein stream of metadata is generated automatically during the execution of the game by the game experience software module.

3. The system as claimed in claim 2, wherein the stream of metadata is recording during execution of the interactive computer game.

4. The system as claimed in claim 3, wherein the stream of metadata includes timestamps for synchronizing with timestamps included in the recorded gameplay experience.

5. The system as claimed in claim 1, wherein the stream of metadata is linked to the user that generated the gameplay experience and an interactive game from which the metadata was recorded.

6. The system as claimed in claim 1, wherein the game experience software module includes computer executable instructions, that when executed by the computing hardware are configured to:
   record one or multiple streams of data corresponding to the game playing experience comprising a video content corresponding to the gameplay experience, an audio content corresponding to the gameplay experience, a video content of the user captured using a camera recording device during execution of the interactive computer game or screen shots of the execution of the interactive game including graphical user interface elements, and the stream of metadata corresponding to the gameplay experience.

7. The system as claimed in claim 1, wherein the stream of metadata includes one or more metadata events which are searchable when subsequently searching for gameplay experiences and while viewing the gameplay experience.

8. The system as claimed in claim 1, wherein the communication interfaces are configured to communicate the recorded gameplay experience via a database arrangement for selective distribution therefrom to viewers.

9. The system as claimed in claim 8, wherein the database arrangement is configured to generate one or more social groups of users and related properties for selective distribution of gameplay experiences therebetween.

10. The system as claimed in claim 1, wherein the devices are implemented using at least one of: smart telephones, pad computers, tablet computers, lap-top computers, personal computers, game-playing consoles.

11. The system of claim 1, wherein the stream of metadata is linked to at least one of:
- a user that generated the gameplay experience;
- a type of game from which the stream of metadata was recorded and wherein the linking is used to search, over one or more social networks, other players that are interested in a game type corresponding to the recorded gameplay experience.

12. The system of claim 1, where the stream of metadata is used to analyse a behaviour of one or more players during the recorded gameplay experience, the analysis enabling a gameplay coaching service.

13. A method of managing game-playing experiences in a system, wherein the system includes one or more game-playing devices provided with communication interfaces for exchanging game-playing experiences therebetween, wherein each device includes computing hardware coupled to a graphical interface for presenting an interactive game thereupon, and wherein the computing hardware is configured to execute one or more game software products including a game experience software module recorded on machine-readable data storage media for generating the interactive game, wherein the method comprises:
- recording an execution of the computer game during execution of the computer game on a game experience software module running on one of the one or more game playing devices, the recorded execution of the computer game comprising a gameplay experience;
- using the game experience software module to generate a stream of metadata concurrently with recording the gameplay experience substantially as presented via the graphical interface;
- the stream of metadata enabling the recorded gameplay experience and an arbitrary number of points or segments of time in the recorded gameplay experience to be subsequently identified, described, analyzed, searched, managed, or edited;
- identifying one or more events that occur during the recorded gameplay experience;
- identifying segments of the recorded game play experience that include the identified one or more events adding a highlight annotation to the stream of metadata to identify the segment as a highlight event, creating an edited version of the recorded gameplay experience that includes only the one or more identified events, and distributing the edited version of the recorded gameplay experience of the one or o devices;
- wherein the stream of metadata includes timestamps and is configured to one or more of:
  - identify or describe a corresponding gameplay experience or arbitrary number of points in time or segments thereof;
  - edit the recorded gameplay experience;
  - annotate the recorded gameplay experience;
  - highlight the recon gameplay experience;
  - execute searches for gameplay experiences or points of interest or segments within gameplay experiences;
  - navigate contents of the recorded gameplay experience;
  - share the recorded gameplay experience;
  - describe the user through his gameplay in one or multiple games;
  - describe the user through observing what types of gameplay experiences and points of interest within gameplay experiences are viewed;
  - search for other players interested in a given type of game associated with the recorded gameplay experience and
  - recommend to a user interesting other users or gameplay experiences that are relevant based on the metadata collected about users and game-play experiences and correlations between them.

14. The method as claimed in claim 13, comprising arranging for the stream of metadata to include timestamps for synchronizing with timestamps included in the recorded gameplay experience.

15. A method as claimed in claim 14, comprising arranging for the stream of metadata to include one or more metadata events which are searchable when subsequently searching for gameplay experiences and while viewing the recorded gameplay experience.

16. A method as claimed in claim 15, comprising generating one or more metadata events automatically by the game experience software module (GESW).

17. A method as claimed in claim 13, comprising operating the communication interfaces to communicate recorded gameplay experiences via a database arrangement for selective distribution therefrom to viewers.

18. A method as claimed in claim 17, comprising operating the database arrangement to generate one or more social groups of users and related properties for selective distribution of gameplay experiences therebetween.

19. A method as claimed in claim 13, wherein the devices comprise one or more of smart telephones, pad computers, tablet computers, lap-top computers, personal computers or game-playing consoles.

20. The method according to claim 13, wherein the method is executed by computing hardware, the computing hardware including a software product recorded on a non-transitory computer readable medium, the software product being executable upon the computing hardware to perform the method.

21. The method as claimed in claim 13, comprising filtering or editing the recorded gameplay experience prior to uploading or live streaming the recorded gameplay experience to others by splitting the recorded gameplay experience into segments, where each segment is associated with one or more metadata event(s), the metadata events defining a starting point and an ending point of the segment, parameters on how to process or edit the segment and an annotation of the segment.

22. The method as claimed in claim 13, comprising:
- record one or more streams of linked data corresponding to the gameplay experience, the streams of linked data comprising a video content corresponding to the recorded gameplay experience, an audio content corresponding to the recorded gameplay experience, a video content of the user captured using a camera recording device during execution of the interactive computer game, or screen shots of the execution of the interactive game including graphical user interface elements; and
- recording a stream of metadata corresponding to the recorded gameplay experience concurrently with the recording of the multiple streams of linked data.

23. The system of claim 1, wherein the stream of metadata comprises one or more metadata events with associated timestamps that are synchronized with the recording.

24. The method of claim 13, wherein the stream of metadata comprises one or more metadata events with associated timestamps that are synchronized with the recording.

25. A method of managing game-playing experiences in a game-play system, wherein the game-play system includes one or more game-playing devices provided with communication interfaces for enabling a viewing and exchange of game-playing experiences therebetween, wherein the one or more game-playing devices comprise computing hardware coupled to a respective graphical interface for presenting a computer game thereupon, and wherein the computing hardware is configured to execute one or more game software products including a game experience software module recorded on machine-readable data storage media for generating the computer game, wherein the method comprises execution of a game software product to:

record an execution of the computer game on a game experience software module running on one of the one or more game playing devices, the recorded execution of the computer game comprising a recorded gameplay experience;

use the game experience software module to generate a stream of metadata concurrently with the recording of the execution of the computer game;

the stream of metadata enabling the recorded gameplay experience and an arbitrary number of points or segments of time in the recorded gameplay experience to be subsequently identified, described, analyzed, searched, managed, or edited;

identifying one or more events that occur during the recorded gameplay experience;

creating an edited version of the recorded gameplay experience that includes only the one or more identified events and associated metadata: and distribute the edited version of the recorded gameplay experience to at least one other of the one or more game playing devices;

where the stream of metadata is used to analyse a behaviour of one or more players during the one or more identified events in the edited version of the recorded gameplay experience.

* * * * *